(12) United States Patent
Niu

(10) Patent No.: US 7,478,905 B2
(45) Date of Patent: Jan. 20, 2009

(54) PLUG CONNECTION TYPE EYEGLASSES ASSEMBLY

(75) Inventor: Shouye Niu, Shenzhen (CN)

(73) Assignee: Elegance Eyeglasses Factory, Guangdong (CN)

( * ) Notice: Subject to any disclaimer, the term of this patent is extended or adjusted under 35 U.S.C. 154(b) by 155 days.

(21) Appl. No.: 11/468,038

(22) Filed: Aug. 29, 2006

(65) Prior Publication Data

US 2007/0046891 A1    Mar. 1, 2007

(30) Foreign Application Priority Data

| Aug. 29, 2005 | (CN) | .................... 2005 2 0063549 U |
| Oct. 21, 2005 | (CN) | .................... 2005 2 0066156 U |
| Mar. 21, 2006 | (CN) | .................... 2006 2 0056687 U |

(51) Int. Cl.
*G02C 7/08* (2006.01)

(52) U.S. Cl. .............................. 351/58; 351/48; 351/140

(58) Field of Classification Search .................... 351/41, 351/47, 48, 57, 58
See application file for complete search history.

(56) References Cited

U.S. PATENT DOCUMENTS

| 6,783,234 B1* | 8/2004 | Hong ............................ 351/47 |
| 7,033,018 B2* | 4/2006 | Ifergan ......................... 351/47 |
| 2005/0174530 A1* | 8/2005 | Ifergan ......................... 351/57 |
| 2005/0206835 A1* | 9/2005 | Cheng ........................... 351/57 |

* cited by examiner

*Primary Examiner*—Huy K Mai
(74) *Attorney, Agent, or Firm*—Global IP Services; Tianhua Gu

(57) ABSTRACT

A plug connection type eyeglasses assembly includes a pair of primary eyeglasses and a pair of secondary eyeglasses. A primary nosepiece of the primary eyeglasses is provided with a plughole, while the secondary eyeglasses is provided with a plug connector or a plug type turnover mechanism at a position corresponding to the primary nosepiece of the primary eyeglasses. The plug connector or the plug type turnover mechanism is inserted into and engaged with the plughole, thereby coupling the primary eyeglasses and the secondary eyeglasses.

10 Claims, 10 Drawing Sheets

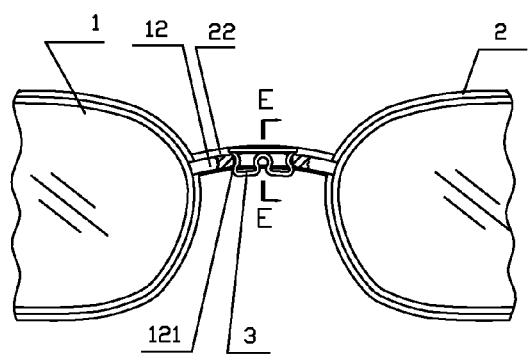
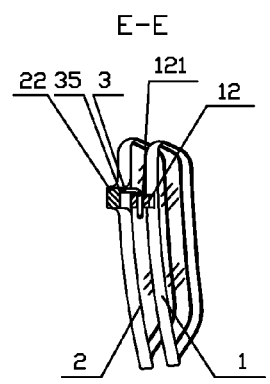
FIG. 14
FIG. 15
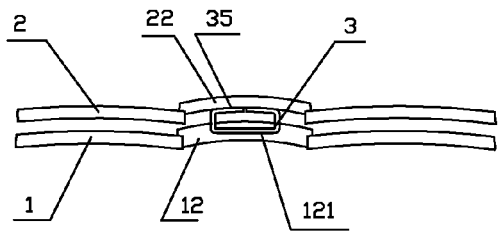
FIG. 16
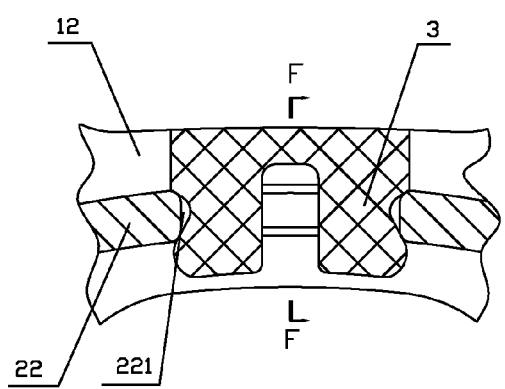
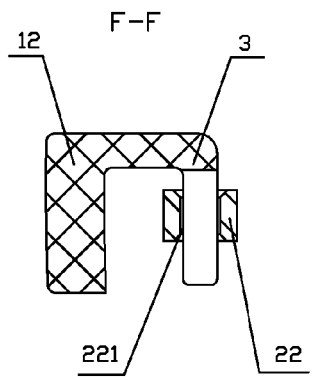
FIG. 17
FIG. 18
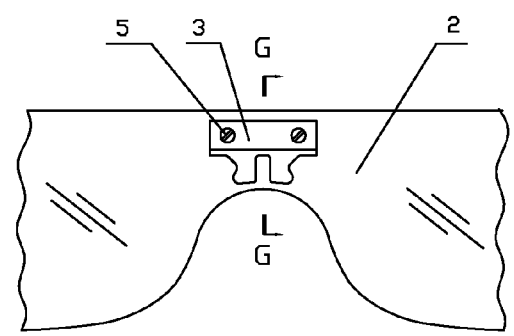
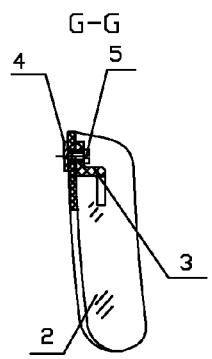
FIG. 19
FIG. 20

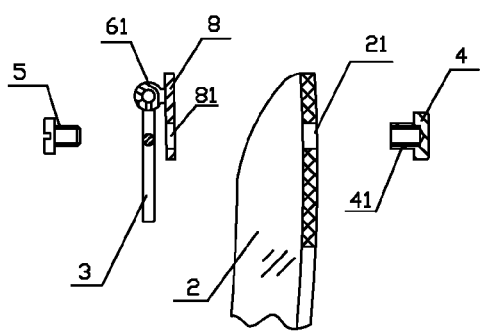
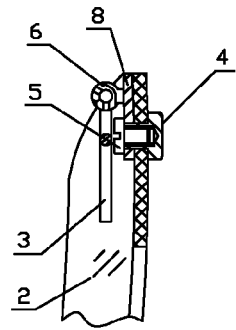
FIG. 28    FIG. 29
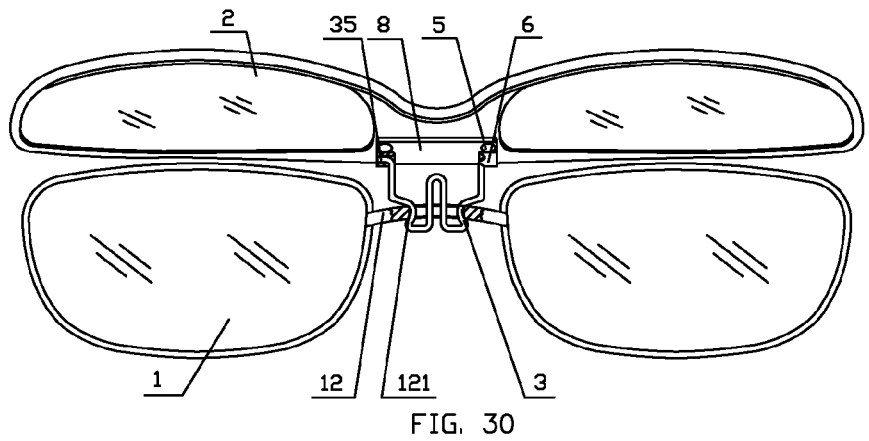
FIG. 30
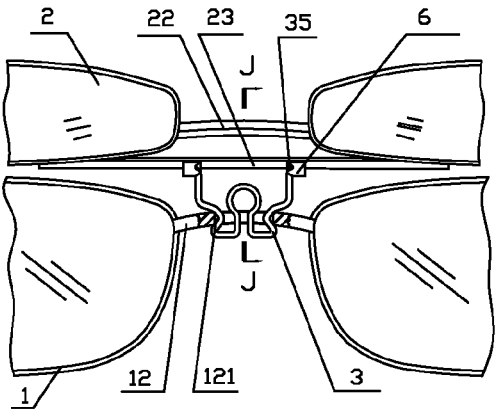
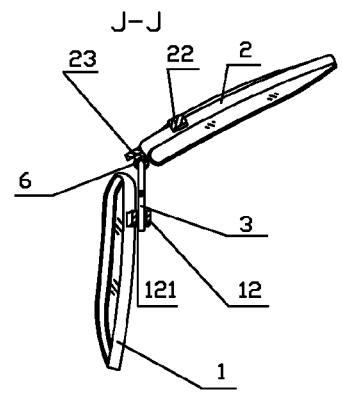
FIG. 31    FIG. 32
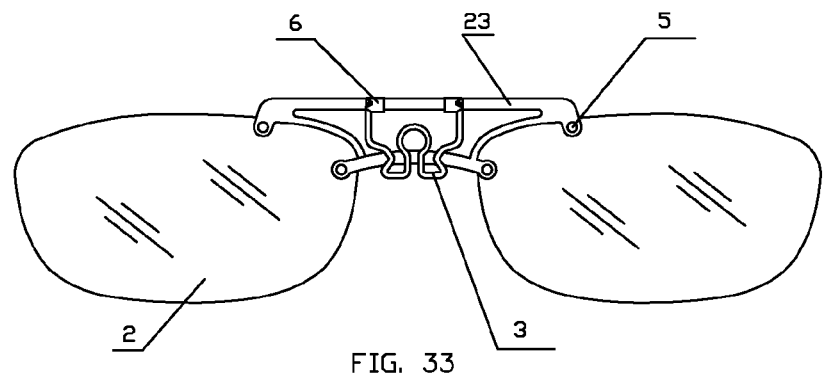
FIG. 33

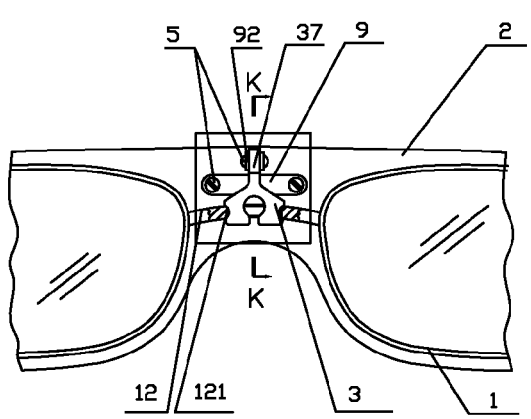
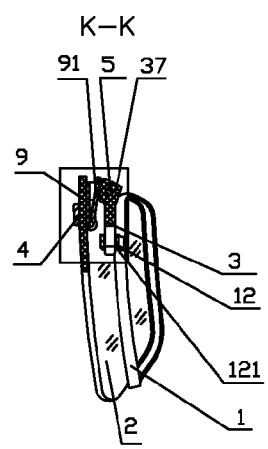
FIG. 34    FIG. 35
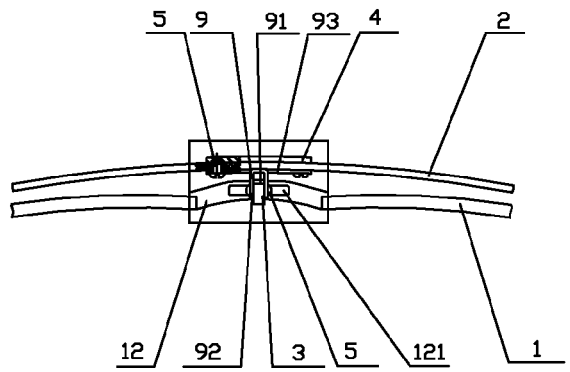
FIG. 36
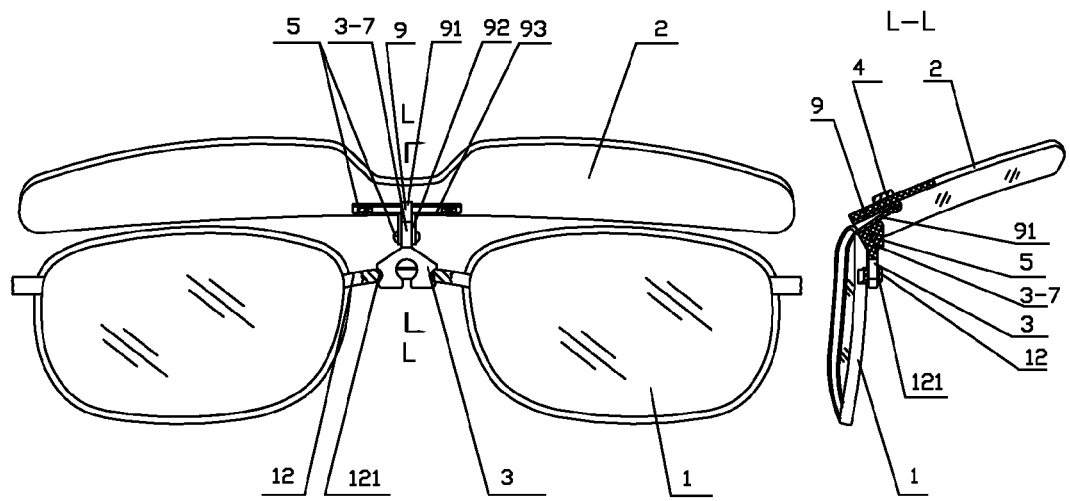
FIG. 37    FIG. 38

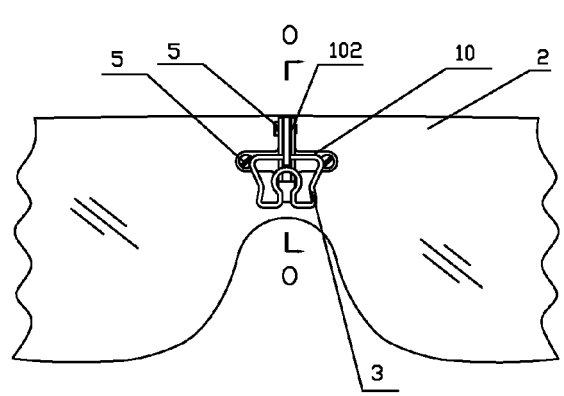 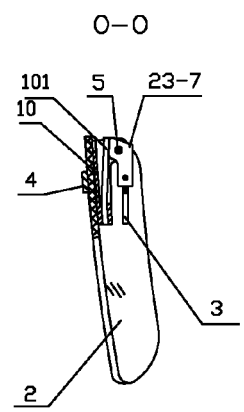
FIG. 47      FIG. 48
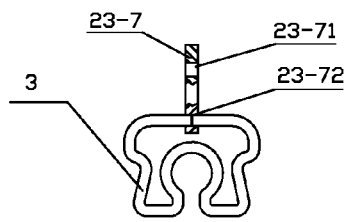 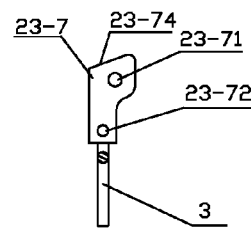
FIG. 49      FIG. 50
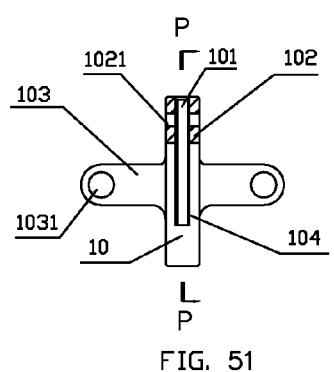 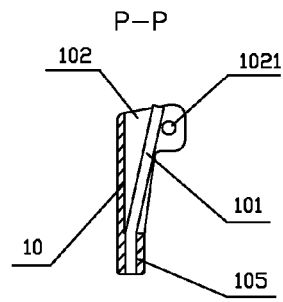
FIG. 51      FIG. 52
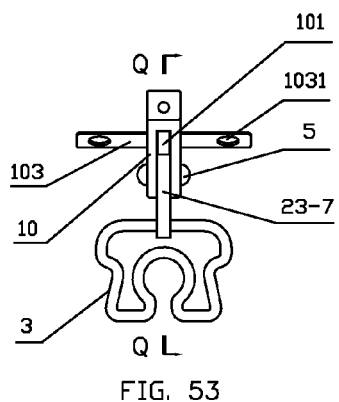 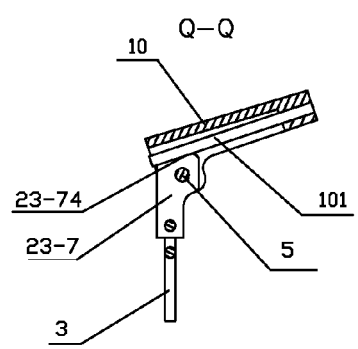
FIG. 53      FIG. 54

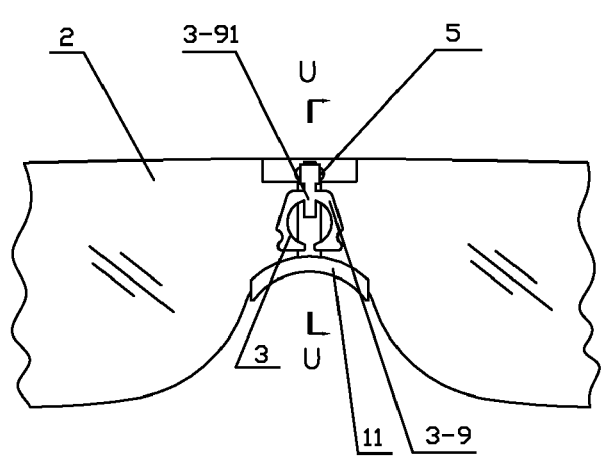
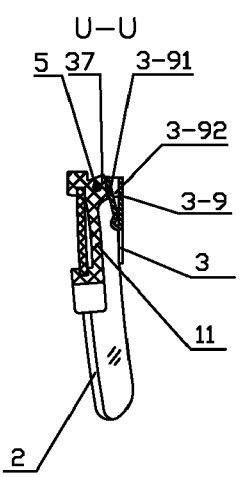
FIG. 62  FIG. 63
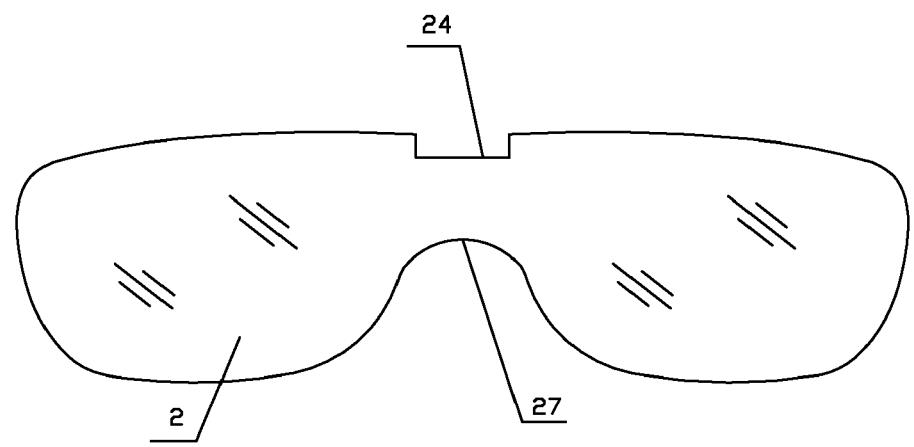
FIG. 64
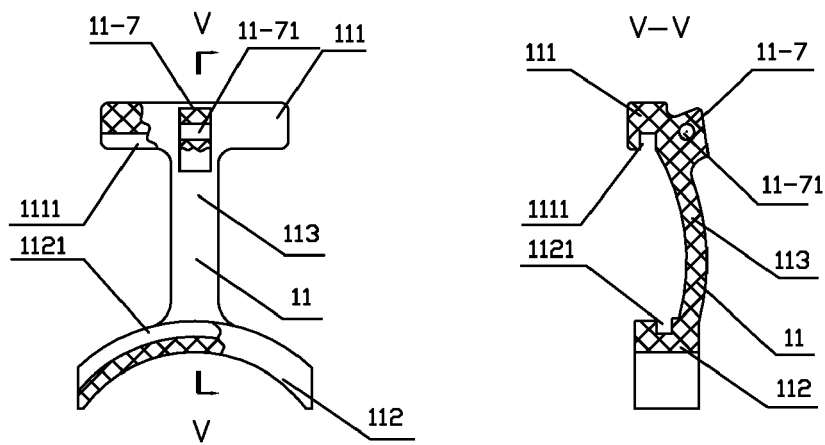
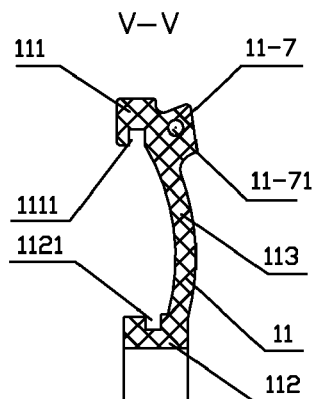
FIG. 65  FIG. 66

US 7,478,905 B2

PLUG CONNECTION TYPE EYEGLASSES ASSEMBLY

CROSS REFERENCE TO THE RELATED PATENT APPLICATION

This patent application claims the priority right of the Chinese patent applications No. 200520063549.1, filed on Aug. 29, 2005; No. 200520066156.6, filed on Oct. 21, 2005; No. 200620056687.1, filed on Mar. 21, 2006.

FIELD OF THE INVENTION

The present invention relates to an eyeglasses assembly in combination with primary and secondary eyeglasses. More particularly, the primary and secondary eyeglasses in the assembly are coupled by plug connection.

BACKGROUND OF THE INVENTION

So far the way to combine and match both a pair of sunglasses or secondary eyeglasses and a pair of optical or primary eyeglasses is highly variable, and the very means utilizing the nosepieces to combine the secondary and the primary eyeglasses is as the follows:

magnet connection, wherein a magnet is provided on the primary nosepiece of the primary eyeglasses, while another magnet is also provided at a corresponding position of the secondary nosepiece of the secondary eyeglasses, the two magnets attract each other thus achieving the combination of the primary and the secondary eyeglasses.

hook connection, wherein a hook is provide on the secondary nosepiece of the secondary eyeglasses, and the hook hooks the primary nosepiece of the primary eyeglasses.

outer spring snap connection, wherein an upper and a lower spring snaps are provided on the secondary nosepiece of the secondary eyeglasses, and they respectively upwardly and downwardly trap in an groove of the primary nosepiece of the primary eyeglasses, or clasp the outer surface of the primary nosepiece of the primary eyeglasses thus realizing the combination of the primary and the secondary eyeglasses.

The combined foldable eyeglasses assembly that is well known includes:

the way of magnet position and hinge rotation: two magnets are respectively provided on the primary nosepieces of the primary eyeglasses and the secondary eyeglasses, and the magnets are installed in the lower portion of a magnetic hole, and the upper portion thereof is empty; Each of the left and right frame of the secondary eyeglasses has a clutch tooth and a sleeve transversely welding thereon. A wire runs through the frame, the clutch turnover mechanism as well as the additional nosepiece respectively to form a removable member. The additional nosepiece also provides two magnets at a position corresponding to the magnets of the nosepiece of the eyeglasses. Half of the each magnet is inserted in the magnetic hole with the other half exposed. When the primary eyeglasses combining with the secondary eyeglasses, the magnets on the secondary nosepiece of the secondary eyeglasses attract the magnets of the primary eyeglasses automatically and then insert in the magnetic holes of the primary nosepiece of the primary eyeglasses for the purpose of cooperation and positioning. However, the shortage of the turnover mechanism is that there are too many nosepieces that are the primary nosepiece, the secondary nosepiece and the additional nosepiece. In order to install and position the magnets, the primary nosepiece and the additional nosepiece are too hypertrophy, and the application field is too narrow, the design is only applied to metal frames eyeglasses, and the eyeglasses assembly is too heavy.

the way of combining the primary eyeglasses with the secondary eyeglasses via lifting hinge: the hinge leaf is made of elastic materials, and is provided with elastic catch and hinge ear, the secondary eyeglasses is formed by the secondary lens installed in the hinge heart; the lifting hinge is formed by the hinge heart installed on the hinge ear, the hinge leaf is installed on the primary eyeglasses; and the hinge heart is made of metal rods which are twisted into desired shapes and is also provided with concavo-convex bottoms. The means of the hinge assembly has a large size and the whole structure is not pleasing.

Hence, a need has arisen for providing an improved plug connection type eyeglasses assembly to overcome the drawbacks mentioned above.

SUMMARY OF THE INVENTION

According to one aspect of the present invention, a plug connection type eyeglasses assembly is provided that includes a pair of primary eyeglasses and a pair of secondary eyeglasses. The primary eyeglasses have a primary nosepiece. A plughole is defined in the primary nosepiece. The secondary eyeglasses provide a plug connector at a position corresponding to the primary nosepiece of the primary eyeglasses. The plug connector is inserted into and engaged with the plughole, thereby coupling the primary eyeglasses and the secondary eyeglasses.

Preferably, the plug connector is an elastomer with an opening formed in the middle thereof.

According to another aspect of the present invention, a plug connection type eyeglasses assembly is provided that includes a primary eyeglasses and a secondary eyeglasses. The primary eyeglasses have a primary nosepiece. A plughole is defined in the primary nosepiece. The secondary eyeglasses provide a plug type turnover mechanism at a position corresponding to the primary nosepiece of the primary eyeglasses. The plug type turnover mechanism is inserted into and engaged with the plughole, thereby coupling the primary eyeglasses and the secondary eyeglasses.

In an embodiment, the plug type turnover mechanism comprises a pair of hinge sleeves fixed to the secondary eyeglasses at a position corresponding to the primary nosepiece and a plug connector with a tail portion thereof pivotally inserted in the hinge sleeves. An end of each hinge sleeve defines at least two stop dents for engaging with the tail portion of the plug connector to stop the plug connector at predetermined positions.

Preferably, the plug connector is wound by spring metal wire and comprises a head portion, a loop gap defined in middle of the head portion, a pair of shoulders projected outwardly, and a neck recessed between the head portion and the shoulders.

In another embodiment, the plug type turnover mechanism comprises a spring piece fixed to the secondary eyeglasses at a position corresponding to the primary nosepiece of the primary eyeglasses and a plug connector pivotally coupled to the spring piece.

Preferably, the spring piece has an inverted U-shaped or inverted R-shaped spring plate, a pair of teeth formed at two free ends of the spring plate and extending inwardly and perpendicularly, and a pair of wings extending sideward from the spring plate. Two through-holes are defined in the pair of teeth for pivotally engaging with the plug connector. The wings define through-holes for securing the spring piece to the secondary eyeglasses.

Alternatively, the plug type turnover mechanism comprises a second spring wire formed elastomer fixed to the secondary eyeglasses at a position corresponding to the primary nosepiece of the primary eyeglasses and a plug connector pivotally coupled to the second spring wire formed elastomer. The second spring wire formed elastomer is cross-shaped and has a main body. An upper end of the main body forms a pair of teeth. An upper portion of the main body defines an elongated slot, and a lower portion of the main body defines a hole communicating with the slot. A metal wire has one end thereof fixed in the hole and the other end thereof extending in the elongated slot and tilted upward between the pair of teeth. A pair of wings extends sideward from middle of the main body. Two through-holes are defined in the pair of teeth for pivotally engaging with the plug connector. The wings define through-holes for securing the second spring wire formed elastomer to the secondary eyeglasses.

Alternatively, the plate turnover mechanism comprises an individual tooth at a position of the secondary eyeglasses corresponding to the primary nosepiece of the primary eyeglasses, a multi-functional elastomer pivotally coupled with the individual tooth, and a plug connector fixed to the multi-functional elastomer. The multi-functional elastomer comprises an inverted U-shaped or inverted R-shaped spring plate and a pair of teeth formed at two free ends of the spring plate and extending inwardly and perpendicularly.

Alternatively, the plug type turnover mechanism comprises a connection member at a position of the secondary eyeglasses corresponding to the primary nosepiece of the primary eyeglasses, an individual tooth pivotally coupled to the connection member, and an plug connector fixed to the individual tooth.

Alternatively, the plug type turnover mechanism comprises a rapid lens-change clamp fixed to the secondary eyeglasses at a position corresponding to the primary nosepiece of the primary eyeglasses and a multi-functional elastomer pivotally coupled to the rapid lens-change clamp.

Preferably, the rapid lens-change clamp comprises an upper clamp body, a lower clamp body, and a middle arced back connecting the upper and the lower clamp bodies, an inner surface of the upper clamps body defining a first clamp groove, an inner surface of the lower clamp body defining a second clamp groove aligning with the first clamp groove, the secondary eyeglasses being clamped between the upper groove and the lower groove.

Preferably, an individual tooth is formed on the arced back adjacent to the upper clamp body 111 and projects outwardly for pivotally coupling with the multi-functional elastomer.

Compared with the prior art, the present invention has the advantages as the follows: (1) a wider application field; The primary eyeglasses can be assembled with various secondary eyeglasses including the integral sun lens eyeglasses, the metal frame eyeglasses, and the plastic frame eyeglasses. (2) much simpler to assemble the primary eyeglasses with the secondary eyeglasses and more convenience to disassemble as well as reassemble the assembly; (3) more flexible to turnover or lift the secondary eyeglasses and more rapid to change the lens of the secondary eyeglasses.

The present invention will be apparent to those skilled in the art by reading the following description of several particular embodiments thereof with reference to the attached drawings, in which:

BRIEF DESCRIPTION OF THE DRAWINGS

FIG. 14 is a back view of an eyeglasses assembly in combination with a pair of metal frame primary eyeglasses and a pair of metal frame secondary eyeglasses according to a fifth embodiment of the present invention with a portion shown in cross section for showing the vertically plug connection of the secondary eyeglasses to the primary eyeglasses;

FIG. 15 is a cross sectional view taken along line E-E of FIG. 14;

FIG. 16 is a top view of FIG. 14;

FIG. 17 is a cross sectional view of a sixth embodiment showing nosepieces of a pair of plastic frame secondary eyeglasses and a pair of plastic frame primary eyeglasses coupled by plug connection;

FIG. 18 is a cross sectional view taken along line F-F of FIG. 17;

FIG. 19 is a back view of a pair of sunglasses assembled with an elastomer of a seventh embodiment according to the present invention;

FIG. 20 is a cross sectional view taken along line G-G of FIG. 19;

FIG. 28 is an exploded view of the integral sun lens and the turnover mechanism;

FIG. 29 is an assembled view of the integral sun lens of the secondary eyeglasses and the turnover mechanism;

FIG. 30 is an assembled view of an eyeglasses assembly of a ninth embodiment according to the present invention, showing a pair of plastic frame secondary eyeglasses in lifted state;

FIG. 31 is a front view of an eyeglasses assembly in combination with a pair of metal frame secondary eyeglasses and a pair of metal frame primary eyeglasses of a tenth embodiment of the present invention, and showing the secondary eyeglasses in lifted state;

FIG. 32 is a cross sectional view taken along line J-J of FIG. 31;

FIG. 33 is a back view of a rimless secondary eyeglasses assembled with an elastomer and a turnover mechanism of an eleventh embodiment of the present invention;

FIG. 34 is a back view of an eyeglasses assembly in combination with a pair of integral sun lens secondary eyeglasses and a pair of metal frame primary eyeglasses according to a twelfth embodiment of the present invention;

FIG. 35 is a cross sectional view taken along line K-K of FIG. 34;

FIG. 36 is a top view of FIG. 34;

FIG. 37 is a front view of an eyeglasses assembly in combination with a pair of integral sun lens secondary eyeglasses, a pair of metal frame primary eyeglasses, a spring piece, and an elastomer according to a twelfth embodiment of the present invention, and showing the secondary eyeglasses in lifted state;

FIG. 38 is a cross sectional view taken along line L-L of FIG. 37;

FIG. 47 is a back view of a pair of integral lens secondary eyeglasses assembled with a turnover mechanism comprised of a first spring wire formed elastomer and a second spring wire formed elastomer;

FIG. 48 is a cross sectional view taken along line O-O of FIG. 47;

FIG. 49 is a view of the first spring wire formed elastomer;

FIG. 50 is a left side view of FIG. 49;

FIG. 51 is a view of the second spring wire formed elastomer;

FIG. 52 is a cross sectional view taken along line P-P of FIG. 51;

FIG. 53 is a view of the turnover mechanism in lifted condition;

FIG. 54 is a cross sectional view taken along line Q-Q of FIG. 53;

FIG. 62 is a back view of a pair of integral sun lens secondary eyeglasses assembled with a rapid lens-change clamp and a multi-functional elastomer;

FIG. 63 is a cross sectional view taken along line U-U of FIG. 62;

FIG. 64 is a front view of the integral sun lens secondary eyeglasses;

FIG. 65 is a front view of the rapid lens-change clamp; and

FIG. 66 is a cross sectional view taken along line U-U of FIG. 65.

DETAILED DESCRIPTION OF ILLUSTRATED EMBODIMENTS

Figure 1:
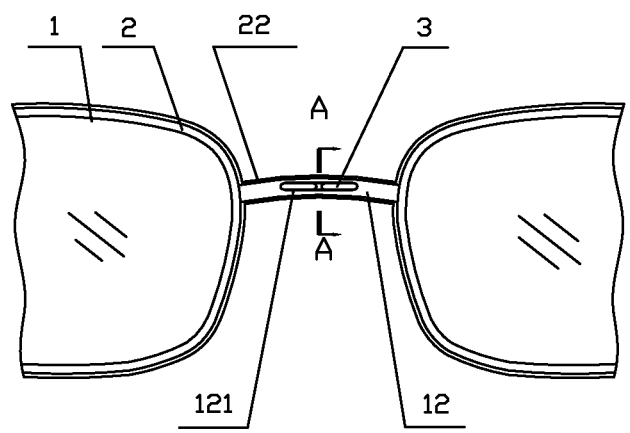
FIG. 1 is a back view of an eyeglasses assembly in combination with a pair of metal frame primary eyeglasses and a pair of metal frame secondary eyeglasses according to a first embodiment of the present invention.

Various preferred embodiments of the invention will now be described with reference to the figures, wherein like reference numerals designate similar parts throughout the various views. As indicated above, the invention is directed to a plug connection type eyeglasses assembly, which comprises a pair of primary eyeglasses and a pair of secondary eyeglasses. A primary nosepiece of the primary eyeglasses is provided with a plughole, while the secondary eyeglasses is provided with a plug connector or a plug type turnover mechanism at a position corresponding to the primary nosepiece of the primary eyeglasses. The plug connector or the plug type turnover mechanism is inserted into and engaged with the plughole, thereby coupling the primary eyeglasses and the secondary eyeglasses.

FIGS. 1-20 show some preferred embodiments of common plug connection type eyeglasses assembly which is further sorted into transversely plug connection type eyeglasses assembly and vertically plug connection type eyeglasses assembly hereinafter.

Figure 2:
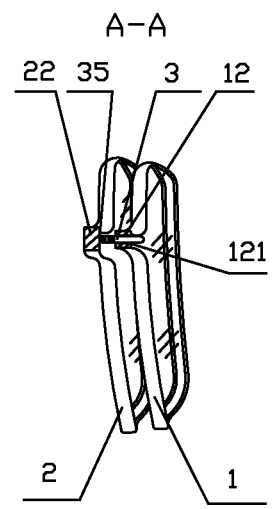
FIG. 2 is a cross sectional view taken along line A-A of FIG. 1.
Figure 3:
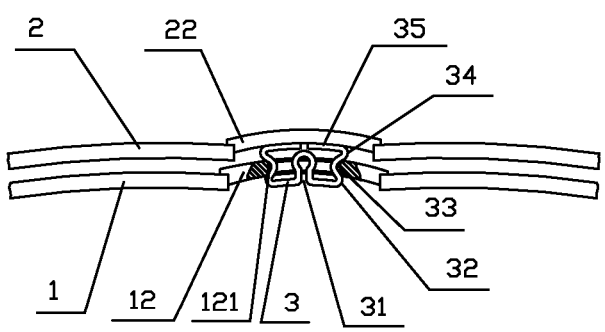
FIG. 3 is a top view of the eyeglasses assembly shown in FIG. 1 with a portion shown in cross section to show the transversely plug connection of the secondary eyeglasses to the primary eyeglasses.

FIGS. 1-3 illustrate a first embodiment of a transversely plug connection type eyeglasses assembly in combination with a pair of metal frame secondary eyeglasses 2 and a pair of metal frame primary eyeglasses 1. The primary eyeglasses 1 has a primary nosepiece 12 with a through plughole 121 defined therein and opening front-to-back. The secondary eyeglasses 2 has a secondary nosepiece 22. A spring wire formed elastomer 3 that serves as a plug connector is fixed to the back of the secondary nosepiece 22 for engaging with the plughole 121. The elastomer 3 is wound into butterfly-shape by thin spring wires. The upper part of a tail portion 35 of two wings of the elastomer 3 is soldered to the back of the secondary nosepiece 22 of the metal secondary eyeglasses 2. A loop gap 31 is defined in middle of head portion 32 of the elastomer 3 to make the elastomer 3 more elastic. Both of the head portion 35 and a shoulder portion 34 of the elastomer 3 protrude symmetrically outwards, and the maximum distance between the protruding parts of the head portion 35 is a little bigger than the length of the plughole 121 of the primary nosepiece 12 of the primary eyeglasses 1. A neck portion 33 of the elastomer 3 recesses inwards, and the distance between the protruding parts of the shoulder portion 34 is a little bigger than the length of the plughole 121 of the primary nosepiece 12 of the primary eyeglasses 1. It will be appreciated that, alternatively, the gap 31 can conform to other shapes, e.g., U-shape, semicircle and various compound figures, so long as it can make the elastomer 3 elastic. With such configuration, the elastomer 3 is able to squeezingly inserted into the plughole 121 and then expand to engage or latch with the plughole 121 at a desired position. Similarly, the elastomer 3 can be pulled out from the plughole 121 conveniently.

Figure 4:
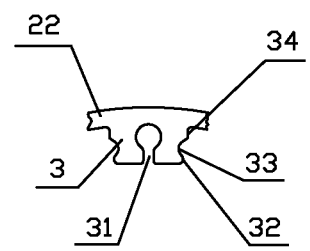
FIG. 4 shows an plastic elastomer of the plastic frame secondary eyeglasses.

The elastomer 3 shown in FIG. 4 is a plastic elastomer with universal significance. Main design points of the plastic elastomer are the same as that of the spring wire formed elastomer except that the plastic elastomer is usually formed integrally with the secondary nosepiece 22, so there is no obvious boundary between the tail portion 35 and the secondary nosepiece 22.

Figure 5:
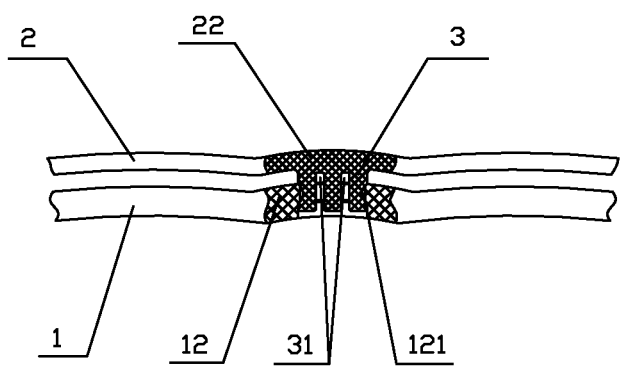
FIG. 5 is a top view of an eyeglasses assembly in combination with a pair of plastic frame primary eyeglasses to a pair of plastic frame secondary eyeglasses according to a second embodiment of the present invention with a portion shown in cross section for showing the transversely plug connection of the secondary eyeglasses to the primary eyeglasses.

FIG. 5 illustrates a second embodiment of a transversely plug connection type eyeglasses assembly in combination with a pair of plastic frame secondary eyeglasses 2 and a pair of plastic frame primary eyeglasses 1. The secondary nosepiece 22 of the secondary eyeglasses is integrally formed with the plastic elastomer 3. The middle of the flat plastic elastomer 3 provides three tongue-like member with two gaps 31 formed there-between. Such configured elastomer 3 is suitable for large-size plastic frame primary eyeglasses 1 with wide plughole 121 as the elastomer 3 is more flexible and can improve the insertion stability and engagement reliability of the elastomer 3 and the plughole 121.

Figure 6:
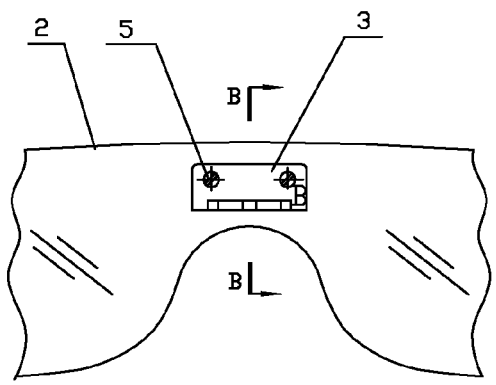
FIG. 6 is a back view of a pair of secondary eyeglasses assembled with an elastomer of a third embodiment according to the present invention.
Figure 7:
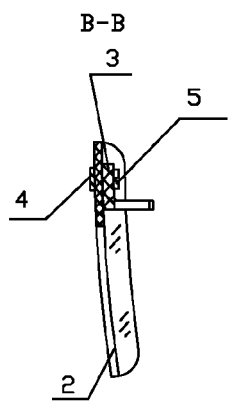
FIG. 7 is a cross sectional view taken along line B-B of FIG. 6.
Figure 8:
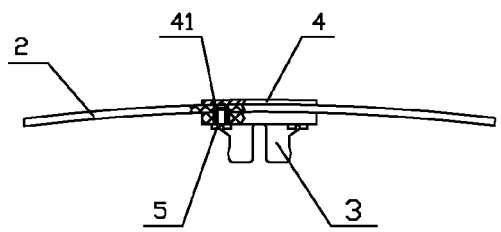
FIG. 8 is a top view of FIG. 6.

FIGS. 6-8 illustrate a third embodiment of a transversely plug connection type eyeglasses. In the present embodiment, the secondary eyeglasses is an integral sun lens secondary eyeglasses 2 assembled with an L-shaped elastomer 3. The elastomer 3 and the integral sun lens secondary eyeglasses 2 are connected with each other via a data-plate 4 and a screw 5.

Figure 9:
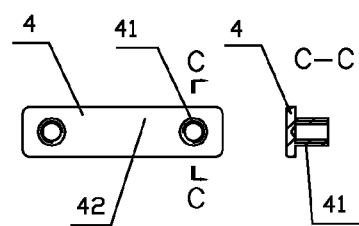
FIG. 9 is a back view of a data-plate for the secondary eyeglasses.
Figure 10:
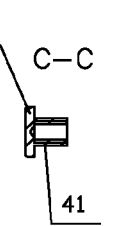
FIG. 10 is a cross sectional view taken along line C-C of FIG. 9.

The data-plate 4 is usually used in the integral sun lens eyeglasses or plastic frame eyeglasses. As shown in FIGS. 9 and 10, the data-plate 4 is comprised of a metal sheet 42 and two posts 41 with thread holes therein. The data-plate 4 has brand signs or decorative pattern on the front surface thereof. The two posts 41 extend through the corresponding holes of the integral sun lens secondary eyeglasses 2 and the elastomer 3 respectively and then are fixed by screws 5. It will be appreciated that, alternatively, the thread hole of the post 41 can be modified by smooth hole. In such case, the post 41 is fixed by a rivet.

Figure 11:
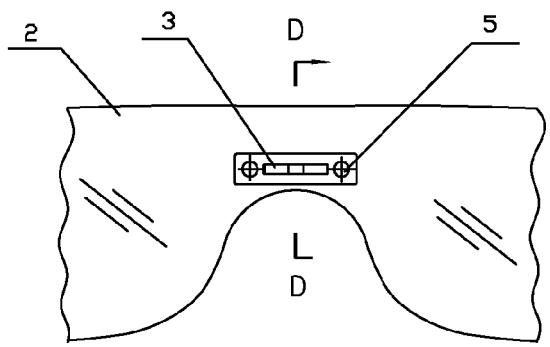
FIG. 11 is a back view of a pair of secondary eyeglasses assembled with an elastomer of a fourth embodiment according to the present invention.
Figure 12:
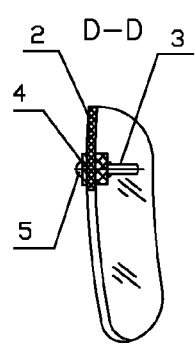
FIG. 12 is a cross sectional view taken along line D-D of FIG. 11.
Figure 13:
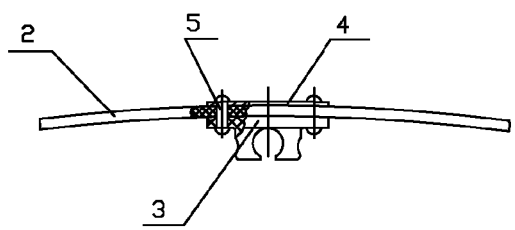
FIG. 13 is a top view of FIG. 11.
Figure 21:
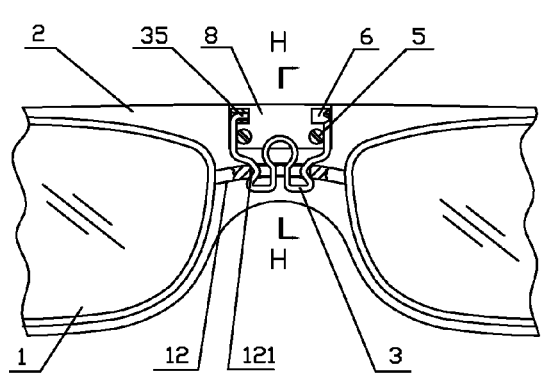
FIG. 21 is a back view of an eyeglasses assembly of an eighth embodiment according to the present invention, showing primary and secondary eyeglasses rotationally coupled by a turnover mechanism.
Figure 22:
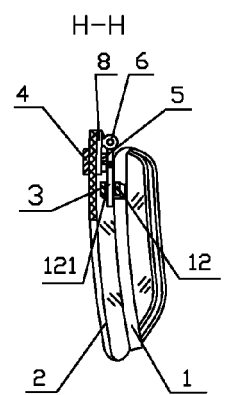
FIG. 22 is a cross sectional view taken along line H-H of FIG. 21.
Figure 23:
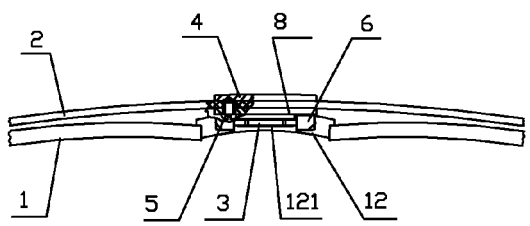
FIG. 23 is a top view of FIG. 21.

FIGS. 11-13 illustrate a forth embodiment of a transversely plug connection type eyeglasses assembly. In the present embodiment, the secondary eyeglasses is an integral sun lens secondary eyeglasses 2 assembled with a plastic elastomer 3. The plastic elastomer 3 that serves as a plug connector is T-shaped and has two holes in the vertical side thereof. The sun lens secondary eyeglasses 2 and the data-plate 4 each have two corresponding holes. The sun lens secondary eyeglasses 2, the elastomer 3 and the data-plate 4 are assembled together by rivets 5 through the holes.

FIGS. 14-16 illustrate a fifth embodiment of a vertically plug connection eyeglasses assembly in combination with a pair of metal frame secondary eyeglasses 2 and a pair of metal frame primary eyeglasses 1. The primary nosepiece 12 of the primary eyeglasses 1 defines a plughole 121 opening up-to down. A spring wire formed elastomer 3 that serves as a plug connector has a horizontal tail portion 35 that is fixed to the back of the secondary nosepiece 22 of the secondary eyeglasses 2 and a plug portion bent downwardly and perpendicularly. The plug portion of the elastomer 3 is also shaped as a butterfly as mentioned above and vertically inserted into the plughole 121 and secured in the plughole 121 in the same way.

FIGS. 17-18 illustrate a sixth embodiment of a vertically plug connection eyeglasses assembly in combination with a pair of plastic frame secondary eyeglasses 2 and a pair of plastic frame primary eyeglasses 1. In the preferred embodiment, the primary eyeglasses 1 is a pair of plastic sunglasses, and the secondary eyeglasses 2 is a pair of optical eyeglasses. The primary nosepiece 12 of the sunglasses 1 is provided with a vertical elastomer 3. The vertical elastomer 3 that serves as a plug connector is vertically inserted into the plughole 221 of the secondary nosepiece 22 of the secondary eyeglasses 2. This combination is suitable for combining big sunglasses with small optical eyeglasses. On the contrary, if the optical eyeglasses is much heavier and bigger than the sunglasses, the optical eyeglasses can serves as a primary eyeglasses while the sunglasses serves as a secondary eyeglasses, that is, the optical eyeglasses has legs while the sunglasses has no leg.

FIGS. 19-20 illustrate a seventh embodiment of a vertically plug connection type eyeglasses assembly. In the present embodiment, the secondary eyeglasses is an integral sun lens secondary eyeglasses 2 assembled with an elastomer 3. The elastomer 3 that serves as a plug connector is a separate member and is comprised of a top vertical body, a bottom vertical body, and a horizontal body between the top and bottom vertical bodies. The top vertical body defines two through-hole. The elastomer 3 and the secondary eyeglasses 2 are connected with each other via the data-plate 4 and the screws 5.

FIGS. 21-66 illustrate some preferred embodiments of a plug connection type eyeglasses assembly coupled by plug type turnover mechanism. FIGS. 21-29 illustrate an eighth embodiment of a plug connection type eyeglasses assembly in combination with a pair of integral sun lens secondary eyeglasses 2 and a pair of metal frame primary eyeglasses 1. A plug type turnover mechanism is provided with the elastomer 3 that serves as a plug connector and a pair of hinge sleeves 6. The hinge sleeves 6 are fixed to the back the secondary eyeglasses 2 at a position corresponding to the primary nosepiece 12 by a connection board 8. The bottom end of the elastomer 3 is inserted vertically into the plughole 121 of the primary nosepiece 12 of the primary eyeglasses 1. The tail portion 35 of the elastomer 3 is bent inwardly and horizontally as to function as a shaft to be pivotally inserted into the hinge sleeve 6. The connection board 8 and the secondary eyeglasses 2 are connected with each other via posts 41 of the data-plate 4 and screws 5, which will be described in greater detail hereinafter.

Figure 24:
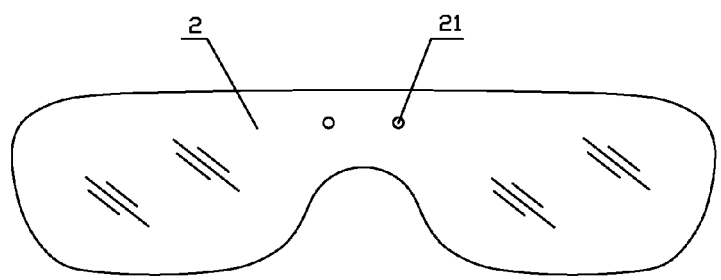
FIG. 24 is a schematic view of an integral sun lens of the secondary eyeglasses shown in FIG. 2 1.

As shown in FIG. 24, the middle part of the sun lens secondary eyeglasses 2 defines with two holes 21 through which the posts 41 extend to secure the connection board 8 to the secondary eyeglasses 2.

Figure 25:
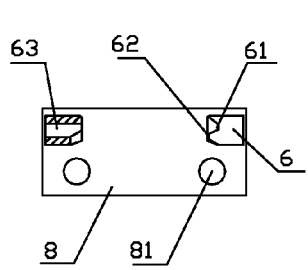
FIG. 25 is an assembled view of a connection board and a hinge sleeve of the turnover mechanism shown in FIG. 21.
Figure 26:
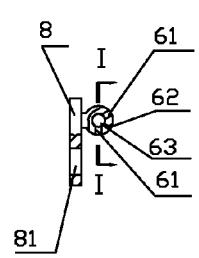
FIG. 26 is a left side view of FIG. 25.
Figure 27:
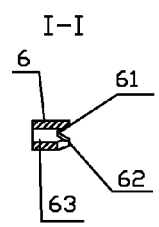
FIG. 27 is a cross sectional view taken along line I-I of FIG. 26.

FIGS. 25-27 show the combination of the connection board 8 which works in conjunction with the integral sun lens secondary eyeglasses 2 and the hinge sleeves 6. The connection board 8 is a metal sheet, and the hinge sleeves 6 are fixed to the connection board 8. The connection board 8 has two holes 81 through which the posts 41 extend to engage with the screws 5, thus the connection board 8 is secured to the secondary eyeglasses 2 via the data plate 4 and the screws 5. Ends of the hinge sleeve 6 define two stop dents 61 and one tooth 62 between the dents 61. When turning over the secondary eyeglasses 2, the tail portion 35 of the elastomer 3 rotates from one stop dent 61 and beyond the tooth 62, then rests into the other stop dent 61. So the stop dents 61 are used to engage with the tail portion 35 of the plug connector 3 to stop the plug connector at predetermined positions so that the secondary eyeglasses 2 can be rested in the predetermined positions.

FIGS. 28-29 are exploded and assembled views respectively of the integral sun lens secondary eyeglasses 2 which includes the data-plate 4, the integral sun lens secondary eyeglasses 2, the connection board 8, the hinge sleeve 6, the elastomer or plug connector 3, and the screw 5. The post 41 is inserted into the hole 21 of the secondary eyeglasses 2 and the hole 81 of the connection board 8 respectively and then engages with the screw 5, thus forming the secondary eyeglasses 2 with plug type turnover mechanism.

FIG. 30 illustrate a ninth embodiment of the eyeglasses assembly which is similar to that of the eighth embodiment except that the tail portion 35 of the elastomer 3 bends outwardly and horizontally and is inserted into the hinge sleeve 6.

FIGS. 31-32 illustrate a tenth embodiment of an eyeglasses assembly in combination with a pair of metal frame secondary eyeglasses 2 and a pair of metal frame primary eyeglasses 1. The eyeglasses assembly in the present embodiment is similar to that of the ninth embodiment except that the secondary eyeglasses 2 further forms a cross beam 23 between the top rims thereof and secured to the rims. A pair of hinge sleeves 6 is secured to the cross beam 23, and the tail portion 35 of the elastomer or plug connector 3 is rotationally inserted into the hinge sleeves 6.

FIG. 33 illustrates an eleventh embodiment of a secondary eyeglasses which is similar to that shown in the tenth embodiment except that the secondary eyeglasses 2 is rimless, and the cross beam 23 is fixed to the lenses of the rimless secondary eyeglasses 2 by screws 5. Usually, the rimless eyeglasses 2 is inseparable with the turnover mechanism.

FIGS. 34-44 illustrate a twelfth embodiment of a plug connection type eyeglasses assembly in combination with a pair of integral sun lens secondary eyeglasses 2 and a pair of metal frame primary eyeglasses 1. A plug type turnover mechanism is provided with the elastomer 3 that serves as a plug connector and a spring piece 9. The whole eyeglasses assembly includes the metal frame primary eyeglasses 1, the integral sun lens secondary eyeglasses 2, the spring piece 9, the elastomer 3, the data-plate 4 and the screws 5.

FIGS. 34-38 show the folded state and lifted state of the secondary eyeglasses 2. These figures also illustrate the relative positions of parts of the eyeglasses assembly.

Figure 39:
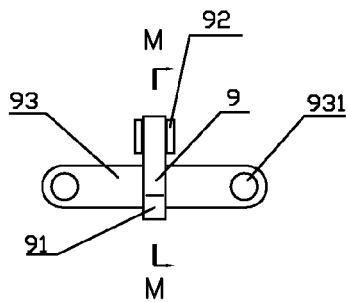
FIG. 39 is a front view of the spring piece.
Figure 40:
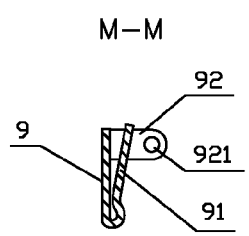
FIG. 40 is a cross sectional view taken along line M-M of FIG. 39.

As shown in FIGS. 39-40, the spring piece 9 is made by bending a spring thin metal sheet. The spring piece has an inverted U-shaped or inverted R-shaped spring plate 91, a pair of teeth 92 formed at two free ends of the spring plate 91 and extending inwardly and perpendicularly, and a pair of wings 93 extending sideward from a branch of the spring plate 91. Two through-holes 921 are defined in the teeth 92 for the purpose of pivotally engaging with an individual tooth 3-7. The two wings 93 define two through-holes 931 through which the spring piece is fixed to the secondary eyeglasses 2 by a fastener.

Figure 41:
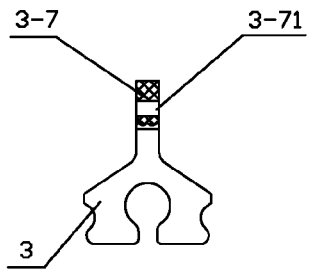
FIG. 41 is a front view of the elastomer.
Figure 42:
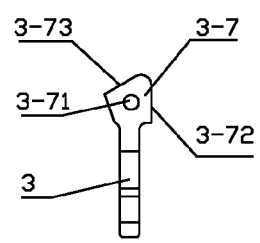
FIG. 42 is a left side view of FIG. 41.

FIGS. 41-42 show the elastomer 3. The individual tooth 3-7 is formed at an end of the elastomer 3. The individual tooth 3-7 includes a hole 3-71, a leading surface 3-72, and a top surface 3-73.

Figure 43:
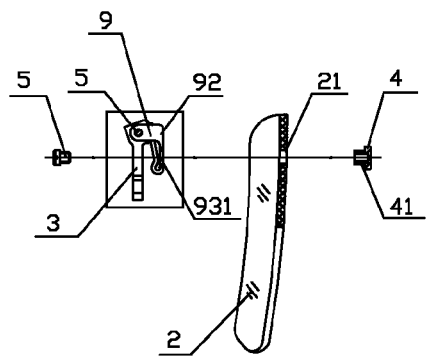
FIG. 43 is an exploded view of the integral sun lens secondary eyeglasses and the spring piece.
Figure 44:
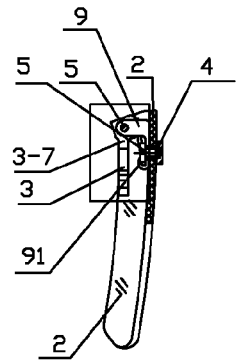
FIG. 44 is an assembled view of the integral sun lens secondary eyeglasses and the spring piece.

FIGS. 43-44 are exploded and assembled views respectively of the secondary eyeglasses 2 and the turnover mechanism. The post 41 of the data-plate 4 extends through the hole 21 of sun lens secondary eyeglasses 2 and through the through-hole 931 of the wings 93 of the spring piece 9, then engages with the screw 5, thereby the spring piece 9 is fixed to the secondary eyeglasses 2. The individual tooth 3-7 is rotationally coupled to the spring piece 9 by a shaft extending through the through-holes 921 of the teeth 92 and the hole 3-71 of the individual tooth 3-7.

Figure 45:
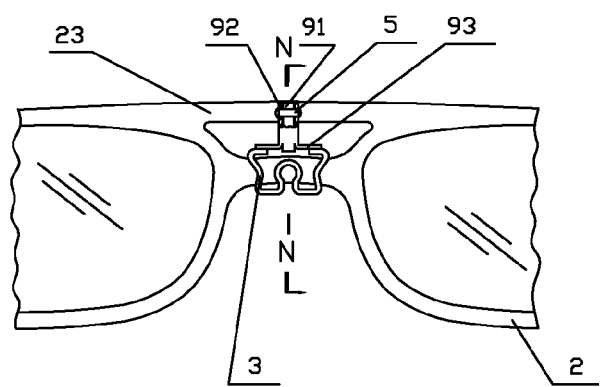
FIG. 45 is a back view of a plastic frame secondary eyeglasses assembled with a spring piece and a spring wire according to a thirteenth embodiment of the present invention.
Figure 46:
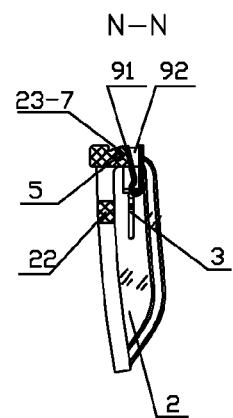
FIG. 46 is a cross sectional view taken along line N-N of FIG. 45.

FIGS. 45-46 illustrate a thirteenth embodiment of a plug connection type eyeglasses assembly in combination with a pair of plastic frame secondary eyeglasses 2 and a pair of metal frame primary eyeglasses 1. A plug type turnover mechanism is provided with the spring wire formed elastomer 3 that serves as a plug connector and the spring piece 9.

A cross beam 23 is integrally formed with the rim of plastic frame secondary eyeglasses 2, while the individual tooth 3-7 is fixed on the middle of the back of the cross beam 23 of the secondary eyeglasses 2. The top portion of the spring wire formed elastomer 3 is fixed to the wings 93 of the spring piece 9. The fastener 5, such as rivets and screws, pivotally couples the pair of teeth 92 of the spring piece 9 and the individual tooth 3-7 of the cross beam 23 of the secondary eyeglasses 2. The spring plate 91 of the spring piece 9 abuts on the leading surface 3-72 of the individual tooth 3-7.

FIGS. 47-54 illustrate a fourteenth embodiment of a plug connection type eyeglasses assembly in combination with a pair of integral sun lens secondary eyeglasses 2 and a pair of metal frame primary eyeglasses 1. A plug type turnover mechanism is provided with a first spring wire formed elastomer 3 that serves as a plug connector, an individual tooth 23-7, and a second spring wire formed elastomer 10.

Referring to the FIGS. 47-48, a middle part of the integral sun lens secondary eyeglasses 2 is assembled with a turnover mechanism at a position corresponding to the primary nose-piece 12 of the primary eyeglasses 1.

The post 41 the data-plate 4 extends through the integral sun lens secondary eyeglasses 2 to secure the turnover mechanism.

Referring to FIGS. 49-50, the individual tooth 23-7 is assembled with the first spring wire formed elastomer 3. The individual tooth 23-7 is made from a metal sheet and has an upper hole 23-71 and a lower hole 23-72 where the individual tooth 23-7 is soldered to the first spring wire formed elastomer 3.

Referring to FIGS. 50-51, the second spring wire formed elastomer 10 is cross-shaped. The upper portion of the main body of the second elastomer 10 is provided with an elongated slot 104, while the lower portion thereof has a hole 105 communicating with the slot 104. One end of a metal wire 101 is fixed in the hole 105, and the other end thereof extends in the elongated slot 104 and then tilts upward between the pair teeth 102. The pair of teeth 102 defines a through-hole 1021 respectively. Two wings 103 extend sideward from the middle of the main body. The wings 103 each define a though-hole 1031 through which the second elastomer is fixed to the secondary eyeglasses 2 by a fastener.

Referring to FIGS. 53-54, the fastener 5 extends through the through-hole 1021 of the pair of teeth 102 and through the through-hole 23-71 of the individual tooth 23-7 to pivotally coupling the second spring wire formed elastomer 10 to the individual tooth 23-7. When the turnover mechanism is lifted, the metal wire 101 abuts on the top surface 23-74 of the individual tooth 23-7.

Figure 55:
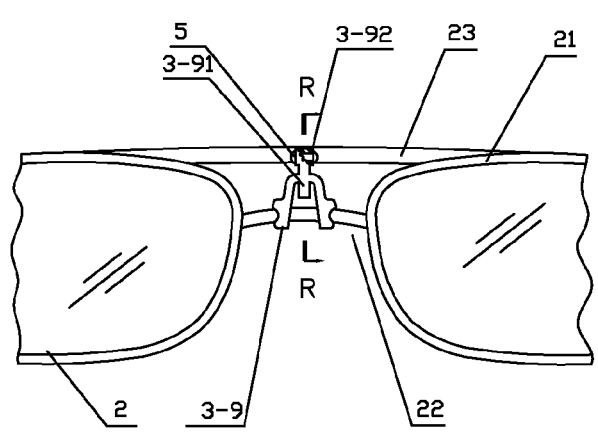
FIG. 55 is a back view of a metal frame secondary eyeglasses assembled with a multi-functional elastomer according to a fifteenth embodiment of the present invention.
Figure 56:
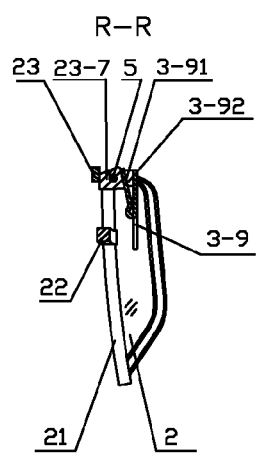
FIG. 56 is a cross sectional view taken along line R-R of FIG. 55.
Figure 57:
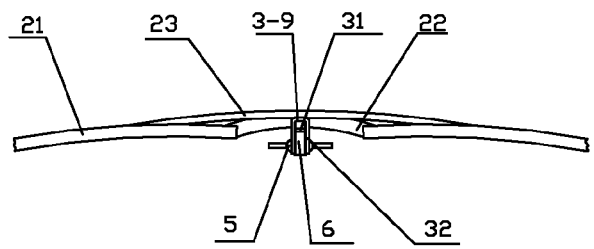
FIG. 57 is a top view of FIG. 55.

FIGS. 55-57 illustrate a fifteenth embodiment of a plug connection type eyeglasses assembly in combination with a pair of metal frame secondary eyeglasses 2 and a pair of metal frame primary eyeglasses 1. A plug type turnover mechanism is provided with a multi-functional elastomer 3-9 that serves as a plug connector and an individual tooth 23-7. Referring to FIGS. 55-56, the cross beam 23 is fixed to the upper rims of the secondary eyeglasses 2. The individual tooth 23-7 is fixed to the middle back of the cross beam 23. The fastener 5 pivotally couples the individual tooth 23-7 and the pair of teeth 3-92 of the multi-functional elastomer 3-9.

Figure 58:
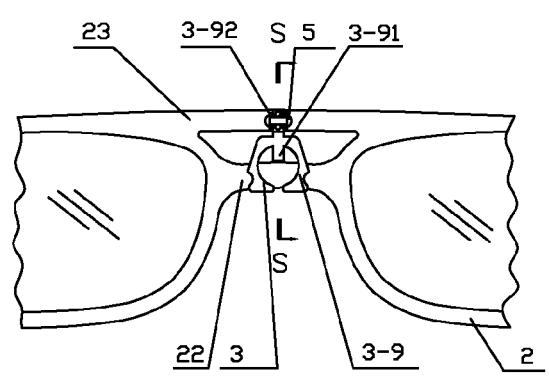
FIG. 58 is a back view of a plastic frame secondary eyeglasses assembled with a multi-functional elastomer according to a sixteenth embodiment of the present invention.
Figure 59:
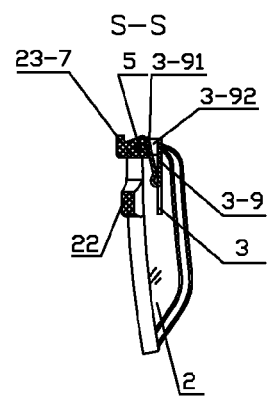
FIG. 59 is a cross sectional view taken along line S-S of FIG. 58.

FIGS. 58-59 illustrate a sixteenth embodiment of a plug connection type eyeglasses assembly in combination with a pair of plastic frame secondary eyeglasses 2 and a pair of metal frame primary eyeglasses 1. The eyeglasses assembly of the present embodiment is similar to that of the fifteenth embodiment except that the individual tooth 23-7 is integrally formed with cross beam 23.

Figure 60:
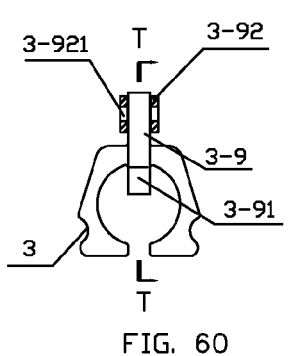
FIG. 60 is a front view of the multi-functional elastomer.
Figure 61:
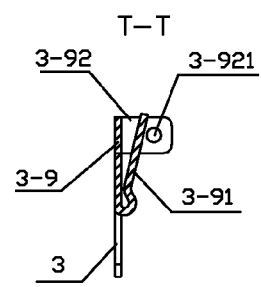
FIG. 61 is a cross sectional view taken along line T-T of FIG. 60.

Referring to FIGS. 60-61, the multi-functional elastomer 3-9 is a spring plate with the structure that the upper end of the multi-functional elastomer 3 has a bended spring plate 3-91, a pair of teeth 3-92 erects on the two sides of the spring plate 3-91, and that a through-hole 3-921 is defined in each of the pair of teeth 3-92.

FIGS. 62-66 illustrate a seventeenth embodiment of a plug connection type eyeglasses assembly in combination with a pair of integral sun lens secondary eyeglasses 2 and a pair of metal frame primary eyeglasses 1. A plug type turnover mechanism is provided with the multi-functional elastomer 3-9 that serves as a plug connector and a rapid lens-change clamp 11.

Referring to FIGS. 62-63, the rapid lens-change clamp 11 is fixed to the integral sun lens secondary eyeglasses 2 at a position corresponding to the primary nosepiece of the primary eyeglasses by fasteners. The fastener 5 is preferred to be a rivet or a screw. The multi-functional elastomer 3-9 pivotally couples to the rapid lens-change clamp 11.

Referring to FIGS. 64, the secondary eyeglasses 2 is an integral sun lens. A groove 24 is defined in the middle of the upper edge of the sun lens, and the circular arc 27 is formed in the middle of the lower edge of the sun lens. The groove 24 and the circular arc 27 are used for mounting the rapid lens-change clamp 11.

Referring to FIGS. 65-66, the rapid lens-change clamp 11 is made of elastic plastic. The rapid lens-change clamp 11 is I-shaped comprising an upper clamp body 111, a lower clamp body 112, and a middle arced back 113 connecting the upper and the lower bodies 111, 112. An individual tooth 11-7 is formed on the intersection of the arced back 113 and the upper clamp body 111 and projects outwardly. The individual tooth 11-7 defines a hole 11-71 through which the multi-functional elastomer 3-9 pivotally couples to the rapid lens-change clamp 11 by a fastener. The inner surface of the upper clamps body 111 defines a first clamp groove 1111. The inner surface of the lower clamp body 112 defines a second clamp groove 1121 aligning with the first clamp groove 1111. When to install the sun lens, the edge of groove 24 and the circular arc 27 of the sun lens are respectively inserted into the upper groove 1111 and the lower groove 1121 of the rapid lens-change clamp 11. The arced back 113 has good flexibility, which facilitates installing the sun lens and ensures the assembly reliability. When the users want to change the color or the style of the sun lens, it is not necessary to turn to optical shop or to employ tools. Instead, the user need only to stretch the upper groove 1111 or the lower groove 1121 of the rapid lens-change clamp 11 with thumb, and then change the sun lens.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A plug connection type eyeglasses assembly comprising:
a pair of primary eyeglasses having a primary nosepiece, a plughole being defined in the primary nosepiece;
a pair of secondary eyeglasses providing a plug connector at a position corresponding to the primary nosepiece of the primary eyeglasses;
the plug connector is an elastomer comprising a head portion, a loop gap defined in middle of the head portion, a pair of shoulders projected outwardly, and a neck recessed between the head portion and the shoulders;
the plug connector being inserted into and engaged with the plughole thereby coupling the primary eyeglasses and the secondary eyeglasses.

2. A plug connection type eyeglasses assembly comprising:
a pair of primary eyeglasses having a primary nosepiece, a plughole being defined in the primary nosepiece;
a pair of secondary eyeglasses providing a plug type turnover mechanism at a position corresponding to the primary nosepiece of the primary eyeglasses, the plug type turnover mechanism having a plug connector, which being inserted into and engaged with the plughole thereby rotationally coupling the primary eyeglasses and the secondary eyeglasses; and
the plug connector is wound by spring metal wire and comprises a head portion, a loop gap defined in middle of the head portion, a pair of shoulders projected outwardly, and a neck recessed between the head portion and the shoulders.

3. The plug connection type eyeglasses assembly according to claim 2, wherein the plug type turnover mechanism comprises a pair of hinge sleeves fixed to the secondary eyeglasses at a position corresponding to the primary nosepiece and the plug connector with a tail portion thereof pivotally inserted in the hinge sleeves, an end of each hinge sleeve defining at least two stop dents for engaging with the tail portion of the plug connector to stop the plug connector at predetermined positions.

4. The plug connection type eyeglasses assembly according to claim 2, wherein the plug type turnover mechanism comprises a spring piece fixed to the secondary eyeglasses at a position corresponding to the primary nosepiece of the primary eyeglasses and the plug connector pivotally coupled to the spring piece;
the spring piece has an inverted U-shaped or inverted R-shaped spring plate, a pair of teeth formed at two free ends of the spring plate and extending inwardly and perpendicularly, and a pair of wings extending sideward from the spring plate, two through-holes being defined in the pair of teeth for pivotally engaging with the plug connector, the wings defining through-holes for securing the spring piece to the secondary eyeglasses.

5. The plug connection type eyeglasses assembly according to claim 2, wherein the plug type turnover mechanism comprises a second spring wire formed elastomer fixed to the secondary eyeglasses at a position corresponding to the primary nosepiece of the primary eyeglasses and the plug connector pivotally coupled to the second spring wire formed elastomer, the second spring wire formed elastomer being cross-shaped and having a main body, an upper end of the main body forming a pair of teeth, an upper portion of the main body defining an elongated slot, a lower portion of the main body defining a hole communicating with the slot, a metal wire having one end thereof fixed in the hole and the other end thereof extending in the elongated slot and tilted upward between the pair of teeth, a pair of wings extending sideward from middle of the main body, two through-holes being defined in the pair of teeth for pivotally engaging with the plug connector, the wings defining through-holes for securing the second spring wire formed elastomer to the secondary eyeglasses.

6. The plug connection type eyeglasses assembly according to claim 3, wherein the plug type turnover mechanism comprises an individual tooth at a position of the secondary eyeglasses corresponding to the primary nosepiece of the primary eyeglasses, a multi-functional elastomer pivotally coupled with the individual tooth, and the plug connector fixed to the multi-functional elastomer, the multi-functional elastomer comprising an inverted U-shaped or inverted R-shaped spring plate and a pair of teeth formed at two free ends of the spring plate and extending inwardly and perpendicularly.

7. The plug connection type eyeglasses assembly according to claim 2, wherein the plug type turnover mechanism comprises a connection member at a position of the secondary eyeglasses corresponding to the primary nosepiece of the primary eyeglasses, an individual tooth pivotally coupled to the connection member, and an plug connector fixed to the individual tooth.

8. The plug connection type eyeglasses assembly according to claim 2, wherein the plug type turnover mechanism comprises a rapid lens-change clamp fixed to the secondary eyeglasses at a position corresponding to the primary nosepiece of the primary eyeglasses and a multi-functional elastomer pivotally coupled to the rapid lens-change clamp.

9. The plug connection type eyeglasses assembly according to claim 8, wherein the rapid lens-change clamp comprises an upper clamp body, a lower clamp body, and a middle arced back connecting the upper and the lower clamp bodies, an inner surface of the upper clamps body defining a first clamp groove, an inner surface of the lower clamp body defining a second clamp groove aligning with the first clamp groove, the secondary eyeglasses being clamped between the upper groove and the lower groove.

10. The plug connection type eyeglasses assembly according to claim 9, wherein an individual tooth is formed on the arced back adjacent to the upper clamp body and projects outwardly for pivotally coupling with the multi-functional elastomer.

\* \* \* \* \*